US012771736B2

(12) United States Patent
Lindgren et al.

(10) Patent No.: US 12,771,736 B2
(45) Date of Patent: Oct. 20, 2026

(54) NETWORK OFFSET

(71) Applicant: Net Insight AB, Solna (SE)

(72) Inventors: Per Lindgren, Strangnas (SE); Christer Bohm, Nacka (SE); Magnus Danielsson, Stocksund (SE); Bengt J. Olsson, Segeltorp (SE)

(73) Assignee: Net Insight AB, Solna (SE)

( * ) Notice: Subject to any disclaimer, the term of this patent is extended or adjusted under 35 U.S.C. 154(b) by 0 days.

(21) Appl. No.: 17/790,879

(22) PCT Filed: Dec. 21, 2020

(86) PCT No.: PCT/EP2020/087405
§ 371 (c)(1),
(2) Date: Jul. 5, 2022

(87) PCT Pub. No.: WO2021/144124
PCT Pub. Date: Jul. 22, 2021

(65) Prior Publication Data

US 2023/0055733 A1 Feb. 23, 2023

(30) Foreign Application Priority Data

Jan. 14, 2020 (SE) .................................... 2050022-9

(51) Int. Cl.
*H04L 65/611* (2022.01)
*H04N 5/268* (2006.01)
*H04N 21/643* (2011.01)

(52) U.S. Cl.
CPC ........... *H04L 65/611* (2022.05); *H04N 5/268* (2013.01); *H04N 21/64322* (2013.01)

(58) Field of Classification Search
CPC ............................. H04L 65/611; H04N 5/268; H04N 21/64322; H04N 21/21805; H04N 21/2187; H04N 21/242
See application file for complete search history.

(56) References Cited

U.S. PATENT DOCUMENTS

| | | | | |
|---|---|---|---|---|
| 5,623,483 A * | 4/1997 | Agrawal | ............... | H04J 3/0632 375/E7.271 |
| 9,332,160 B1 | 5/2016 | Chenillo et al. | | |

(Continued)

FOREIGN PATENT DOCUMENTS

| | | | |
|---|---|---|---|
| WO | WO-2016/162549 | A1 | 10/2016 |
| WO | WO-2017/085024 | A1 | 5/2017 |
| WO | WO-2018/138300 | A1 | 8/2018 |

OTHER PUBLICATIONS

International Search Report PCT/ISA/210 for International Application No. PCT/EP2020/087405 dated Mar. 18, 2021.

(Continued)

*Primary Examiner* — Oschta I Montoya
(74) *Attorney, Agent, or Firm* — Harness, Dickey & Pierce, P.L.C.

(57) ABSTRACT

There is provided a method in a remote media production system in an IP network, in which media production is performed at a stadium or the like, and the produced media content is transferred to a home studio for final production. The media content is transported in individual data streams over a network. In a receiving node R an aggregate of individual delays for the transferred data streams is monitored and form basis for determining at least one network delay correction factor or at least one common network offset for the individual data streams. The method further comprises time adjusting data transmitted over the network with the common network offset.

23 Claims, 6 Drawing Sheets

(56) References Cited

U.S. PATENT DOCUMENTS

| | | | | |
|---|---|---|---|---|
| 10,135,601 | B1 | 11/2018 | Beardsley et al. | |
| 12,634,527 | B1 * | 5/2026 | Gaquin .............. | H04N 21/2187 |
| 2014/0020013 | A1 * | 1/2014 | DiLorenzo ......... | G06Q 30/0251<br>725/32 |
| 2014/0152834 | A1 | 6/2014 | Kosseifi et al. | |
| 2014/0168514 | A1 * | 6/2014 | Altmann ............ | H04N 21/6377<br>348/513 |
| 2014/0250484 | A1 | 9/2014 | Duennebier et al. | |
| 2018/0337765 | A1 * | 11/2018 | Beardsley ............. | H04L 65/764 |

OTHER PUBLICATIONS

Written Opinion PCT/ISA/237 for International Application No. PCT/EP2020/087405 dated Mar. 18, 2021.

Chinese Office Action dated Sep. 9, 2023 for corresponding Chinese Application No. 202080093693.7.

* cited by examiner

NETWORK OFFSET

CROSS-REFERENCE TO RELATED APPLICATIONS

This application is a national phase under 35 U.S.C. § 371 of PCT International Application No. PCT/EP2020/087405 which has an International filing date of Dec. 21, 2020, which claims priority to EP Application No. 2050022-9, filed Jan. 14, 2022, the entire contents of each of which are hereby incorporated by reference.

FIELD OF THE INVENTION

The present invention relates to sending data streams between at least one remote media production site and a central site, such as a studio, over IP networks, and more particularly to network offset adjustments for media streams like video, audio and data signals.

BACKGROUND OF THE INVENTION

Traditional outside broadcasting of e.g. sports events utilizes mobile control rooms which often are arranged in at least one van (or bus), sometimes referred to as Outside Broadcasting Van, OB Van. The mobile OB Van is positioned at, or near, a remote site of recording and is arranged to receive signals from e.g. cameras and microphones arranged at the sports event. In the OB Van the signals may be processed and then transmitted over a network to a central studio for final production and broadcasting. In recent years, remote production has been developed where many of the operations of the production is done centrally instead of at the venue which means that parts or all of the functionality of the mobile OB Van is moved to a broadcast center (Remote Broadcast Centre, RBC) or directly to a central production hub (home studio), which is arranged remotely from the actual event. The venue, the RBC and/or the central production hub are interconnected with a network that carries video, audio and data signals. Remote production is in some markets also called At-home production.

Remote and distributed production has great benefits, since a large portion of the resources needed for the production are located at a distance from the actual venue site or can even stay "at-home" at the central production hub to produce more content with less resources. All or parts of processing equipment for replays, editing, camera control, audio and video production can be installed at the RBC (or at the central production hub). The centrally located equipment and people operating them may thus be used for more productions since they do not need to be transported, which means that a higher utilization rate can thus be reached. The higher utilization means that it is possible to lower the cost or to use better talent and better equipment. However, when the processing equipment is remote from the production site more or all video, audio and data signals must be available at the RBC as if the production was located inside the venue. Hence, the video, audio, data and communications need to have very low latency and virtually lossless video and audio transport.

Production—and editing equipment typically require video, audio and some data signals to be synchronized, or with very little offset in order to produce the material. Video signals need to be so called frame synchronized to be able to switch between the different cameras during the production of the final stream. Also, the associated audio and data signals might need to be synchronized both between themselves and with respect to the video signals. In the final production, video needs to be synchronized with audio and associated data such as meta data or subtitles. Using networks with for example dedicated fiber and relatively short distances, synchronization, delay and data loss normally do not cause a problem but to fully leverage on remote and distributed production there is a need to use general purpose networks and also potentially operate over longer distances which can be even operating between continents. For remote or distributed production over general-purpose wide area network there the network will provide different delays for different signals (streams) which sometimes are large and since the traffic for remote/distributed production shares the network with other traffic, there may also be losses as a result of congestion. Different delays for different signals (streams) can become a large challenge.

In legacy video and audio networks, synchronization was achieved using frame stores at the receiving side clocked by the receiving clock and by using managed slips (duplicate or remove) on whole frames, and it was possible to handle difference in playout frequency and receiving frequency. Often the audio was embedded in the video streams while in new production scenarios such as ST 2110, audio, video and data are treated separately, or the audio and video are synchronized manually by an operator.

Most communication is unified using Internet technology, the Internet protocol (IP), which has been the case for a long time in telecom and IT networks and is now also being used for TV production. The specific needs of TV production, like short, predictable delay and lossless transport, are handled by different technologies to overcome the short comings of the IP protocol by replicating data, control plane improvements, etc.

Since a sports event is typically captured by a multiple of cameras and/or microphones placed at different locations at the event site, each camera and/or microphone generates an individual IP signal containing the captured signal, including e.g. audio data, video data, metadata etc., depending on the associated source. Some signals can be locally processed and mixed/selected while others are transported for processing at RBC or a central studio. The remote production can be enhanced with distributed production meaning that some signals are sent to one site and others to another site for processing. The processed signals are then sent from these other sites to the central site to put all components together for the final produced program/signal.

The signals are thus transported from one or more productions sites over the network potentially in different links (paths) to e.g. the RBC, and the individual signals, i.e. the individual data streams, will experience for instance different link delays and buffer delays through network nodes through the network. In addition, different signals can be processed, e.g., compressed, encoded, format converted (e.g. MPEG-coding conversion) etc., which in turn can add different delays to the different signals.

In a production system (local or remote production), the source devices, like the cameras, microphones etc., may derive a timing reference from some common master source, such that the timing of the internal clocks in all the source devices is accurately synchronized. A protocol based on the Precision Time Protocol (PTP) can be used for such a clock synchronization, by delivering a precise time that can be used to timestamp the video signals and/or packets, or local GPS receivers can be used to obtain a common clock reference signal at source and destination. However, even if the common master source is applied at the remote production site(s), this does not align the received data streams/IP signals at the RBC/central processing hub.

Modern receiver equipment is typically designed for handling small differences in latencies, i.e. delay stemming from transmission between a source device and a receiver device, since they are designed to being used within one facility where the delays are short. The signal paths through the WAN often differ too much which means these latencies can cause the signals from different source devices to be misaligned at the RBC to an extent leading to a variety of timing errors in the following processing and broadcasting of the media content.

SUMMARY OF THE INVENTION

It would be advantageous to provide an improved method for remote and distributed productions of e.g. sports events and the like, which addresses the above-mentioned problems, and which facilitates remote production of live media content, such as TV/video/audio streams, from a remote production site over an IP network like e.g., the Internet, IP/MPLS or IP over optical, to a remote or central production site. The ambition is to make the operation at the central site appear as if it is done locally at the remote site. Using remote production has benefits, such as access to all archives, at all events use the best audio mixer, talent, etc. which has not been practically possible with traditional production. The current inventive concept provides a method for remote production which is advantageous for maintaining frequency and time synchronization both within a single data stream and in particular between different data streams in a system where there is a WAN with different delays across the network as a result of different delays for different paths, congestion in the network, different fault recovering schemes like 1+1 hitless protection (2022-7) or retransmission of lost packets, e.g. because of use of ARQ protocols such as RIST, SRT and ZIXI. This is key for ensuring low latency and to ensure a smooth and effective operation.

This object is achieved by a method according to the present invention as defined in the appended claims, which is directed to compensating for the propagation time of the traffic with a common network offset determined for a set of media streams transmitted over individual links through the network, rather than based on a link by link offset (delay) compensation. In particular this is performed to ensure that a set of different streams that belong to the same or similar productions is treated in a similar way to ensure alignment of time and frequency synchronization.

According to a first aspect of the inventive concept, there is provided a method for remote media production in an IP network comprising at least one receiving node monitoring an aggregate of individual delays for a multiple of individual data streams being transmitting over the network from at least one production node to the receiving node, and determining at least one network delay correction (CORR) factor based on the aggregate of individual delays. The method further comprises time compensating data in the data streams transmitted over the network with the at least one CORR factor, or a selected one of the at least one determined CORR factor. Thereby, time compensation of data (i.e. time compensation of timing data of packets) is determined on an aggregate level for a set of data streams. According to embodiments of the inventive concept, such time compensation concerns restamping the video signals and/or packets by adding such CORR factor, thereby aligning the streams so they are aligned, and/or buffering packets/frames and releasing them aligned. For example, if a packet P1 from a video signal V1 is timestamped at its source with a first time t1, and arrives at a receiver at a second time t2, the packet is buffered and released at a third time which is time compensated with a selected CORR factor $t_{CORR}$, i.e. $t1+t_{CORR}$, thus the packet is buffered during a determined time $(t1+t_{CORR}-t2)$. As previously indicated, the delay through the network does not only need to be WAN delay but can also originate from other delays caused by e.g. other sites/nodes through which the data streams pass for processing. It can also be a case that delay compensation can be a tandem of delays from stadium to processing site, processing delay, processing to central site.

According to an embodiment of the method, the individual data streams are associated with at least one of a number of predetermined groups. The predetermined groups are preferably selected from one of a specific production node, a specific sub-event, type of media stream, such as a video stream, audio stream, metadata/ANC stream, audio-video stream, specific technology of the production nodes/receiving nodes, and geographic region. The CORR factor may be referred to as a group common delay offset or a WAN delay offset. This delay offset is normally relevant for what the cameras, microphones, etc. commonly can catch. For example, all cameras and microphones capturing a soccer game is a natural group while a studio at the same site can be a separate group (and/or subgroup of a hierarchy of groups).

According to an embodiment of the method, the step of determining the CORR factor may be performed periodically or continuously. The CORR factor needs to be sufficiently large to accommodate worst case delays for individual data streams but it should not be larger than needed due to the strive to shorten delay and natural operation of remotely located equipment such as cameras, etc. Each of the individual delays may be determined based on time stamps included in the individual data streams sent from the receiving node, however the results of individual delays are not treated individually but as an aggregate i.e. it is the collected group result that is evaluated.

According to an embodiment of the method, the step of determining a network offset correction (CORR) factor comprises determining from an aggregate of delays for a set of individual links (LSET) at least one of an average delay value, a minimum delay value, a maximum delay value, an optimum delay value, and a CORR factor within at least one predetermined margin value. The margin value may be determined between a minimum margin value or minimum margin range and a maximum margin value or maximum margin range. The different CORR factors and margins may be selected based on historic data of the network or a current network status etc.

According to an embodiment of the method, the optimum delay, and/or max- and min margin values are determined by at least one of calculating an offset value plus an estimated value, measuring network properties, e.g. delay or arrival times of packets on the individual links as compared to actual time, determined by a third part, e.g. an A1 system based on experience, a management interface, or by machine learning or a combination thereof.

Removing Minimum WAN Delay Offset, ΔMin

According to an embodiment of the method, the step of time compensating data comprises at the receiver (or as will be further discussed below at the sender, e.g. at a stadium, or any intermediate node, such as a gateway at the sender side (stadium) or receiver) timestamping data of the data streams with a time stamp compensated based on a selected CORR factor. Packets received in the individual data streams may be time compensated e.g. by removing a CORR factor selected to be a minimum delay value, Δmin, from the actual experienced individual delay, which is advantageous to make all data streams experience the same minimum delay in the net. When forwarding a plurality of data streams to a television studio, it is advantageous to decrease the number of expired time stamps (the receiver cannot handle too old timestamps, e.g. if the video streams pass over a WAN with e.g. 100+ ms, the receiver and the receiver buffer are not able to handle the time stamps.

According to embodiments of the inventive concept, the timestamping of data may be performed by changing the existing time stamp, adding an additional compensated time stamp in the same packet as the data or in a new packet associated with the original packet.

According to an embodiment, the PTP time reference (or other utilized time reference) is adjusted with a selected CORR factor.

Adding Max WAN Delay Offset, Δmax

According to an embodiment of the method, the step of time compensating data comprises at a gateway or receiving node timestamping data with a local time stamp compensated by exchanging the experienced delay with the obtained CORR factor selected to be a maximum delay value, Δmax, thereby making all data received via different data streams seem to experience the same delay in the network when forwarding to studio without buffering.

Frame Alignment in Gateway

According to an embodiment of the method, the step of time compensating data comprises at gateway or receiving node: buffering data received in the respective data streams and forwarding the buffered data at a time compensated with the CORR factor. The CORR factor may be selected to be the maximum delay, Δmax, for the incoming data streams, which is advantageous to coordinate the data streams to seem to have experienced the same delay through the network. Optionally, such time compensation is additionally performed by at the same time compensating for frame time (e.g. 20 or 40 ms), to provide mutual frame alignment between the data streams generated at the remote site and streams generated at the local studio. Frame start at the receiving end (e.g. Studio clock Frame Start) will dictate when a received data stream can be sent into a studio LAN. This alignment can be for example for video only or for all streams related to the production and can be performed in a gateway or receiver equipment like a video switcher.

According to an embodiment of the method, it further comprises monitoring time stamps of incoming data streams to be time compensated based on a selected CORR factor. By comparing subsequent time stamps in the incoming data streams of e.g. a selected group, sudden changes in time stamps of the incoming data streams can be identified. If data packets start arriving late, or if the time compensated timestamps (T+CORR factor) as compared with real time has a large marginal, this may indicate that a new CORR factor needs to be selected or determined from the aggregate set of delays LSET. To set the new CORR factor in a (real time) media stream or when shifting scene, or shifting between the stadium and the studio, the audio and video may need to be adjusted, e.g. by repeat and/or skip frames.

If some processing such as processing of audio is performed for example at a remote stadium or other site, while processing of video is done at central site, it might not be beneficial to align all streams equally at an ingress/incoming gateway (GW). Instead a delay budget end-to-end is performed to calculate correction factors to optimize the adjustment and time stamping based on processing delays in the destination site. This can be implemented using control plane features that announce delay contributions in the chain of transport and processing. It is also possible to decide the end-to-end delay in the end device where signals are combined which can be where audio, video and ANC data is put together for distribution to a distribution network or to the consumer or where for example different video signals are merged/switched.

Shifting between different cameras in a video switcher needs to be done on frame starts, which means that frame starts need to be aligned before entering the video switcher. In a studio, delay within the studio equipment is short and the since the studio equipment receives timing from the same time source this delay is a small issue. In remote production, some cameras are remote and some are at the studio and with all delays it can be that the frame starts are offset with up to 40 ms between remote and local studio cameras. The normal way of solving this is simply to delay the remote camera using a so-called frame buffer at the receiving end, so the frame start of the remote cameras are aligned to the local frame clock and local studio cameras at the home production site. However, this introduces a delay up to a full frame time. To optimize the delay, the current invention further suggests that the clock at the remote site is "adjusted" taking into account the delay to the central studio so the frame start of arriving frame starts from the remote site are in line with the frame starts of the local studio cameras. This means that the remote cameras are not frame aligned to the local studio clock but compensated (start their frames earlier, or in some special cases later) with the delay factor calculated for the video streams. This reduces the so important delay for remote productions up to a full frame time, which can be e.g., 20 or 40 ms, i.e. in many cases longer than the actual network delay. The frame start can be triggered by the actual clock (e.g., via IEEE1588 signal) delivered to the remote cameras or by a Black Burst or equivalent signal that is used to synchronize the frame starts of the remote equipment. This means the method can be used either by compensating the actual time used (e.g., by the IEEE1588 or other sync network) at the remote site or by adjusting the Black Burst or equivalent sync signal used, depending on synchronization method and equipment used. This method can be done for both video, audio and other equipment, but is preferably used for unidirectional streams such as camera feeds or commentary.

Source Time Manipulation

According to an embodiment of the method, in addition to the embodiments above or alone, the step of time compensating data comprises at at least one production node time stamping data of at least one source device with a local time stamp compensated by the CORR factor; and immediately transmitting the data, that is without buffering such that data appears to have been sent earlier (or later) in time.

According to an embodiment, instead of time compensating the time stamps or as a complement to other time compensations performed in the network, the source time or production node local clock, e.g. the reference source clock of a camera responsible for generating video frames, is adjusted, i.e. the clock time, Tclock, is time compensated with the CORR factor or optionally the CORR factor minus a multiple of video frame time length, $T_{frame}$, to time compensate further for frame start alignment with respect to frame start of e.g. locally generated data streams of a local studio receiving the data stream. That is, if e.g. the CORR factor Δmax is selected, the source time is adjusted to ($Tclock+\Delta max-N*T_{frame}$), which is advantageous since no buffering of the output signal from source is needed. The $N*T_{frame}$ factor is used when $\Delta max>T_{frame}$ and is an optional optimization.

According to an embodiment, such adjusted reference source clock is generated at said receiving node and distributed over the network using a network time protocol such as IEEE1588, NTP or other Network Time Transfer protocol.

According to an embodiment, such adjusted reference source clock is generated at the production site, using the reference clock and the CORR factor received from the receiving node.

According to an embodiment of the method, each of the individual data streams is one of a live content stream or a pre-recorded content stream.

According to an aspect of the invention, there is provided a node in a distribution network comprising means like processor, circuitry, memories etc. for performing a method according to the present inventive concept.

According to an embodiment, a Gateway in a WAN production network comprising means like processor, circuitry, memories etc. for performing a method as described method herein for one or multiple receivers.

According to an embodiment, there is provided a receiving studio processing equipment, e.g. a video switcher, which comprises means like processor, circuitry, memories etc. for performing a method as described herein.

According to an aspect of the invention, there is provided a software module adapted to perform the method a method according to the present inventive concept, when executed by a computer processor, which advantageously provides a simple implementation and scalability of the solution.

Embodiments of the present inventive method are preferably implemented in a distribution, media content provider, or communication system by means of software modules for signaling and providing data transport in form of software, a Field-Programmable Gate Array (FPGA), an Application Specific Integrated Circuit (ASIC) or other suitable device or programmable unit, adapted to perform the method of the present invention, an implementation in a cloud service or virtualized machine (not shown in diagrams). The software module and/or data-transport module may be integrated in a node comprising suitable processing means and memory means, or may be implemented in an external device comprising suitable processing means and memory means, and which is arranged for interconnection with an existing node.

Further objectives of, features of, and advantages with, the present invention will become apparent when studying the following detailed disclosure, the drawings and the appended claims. Those skilled in the art realize that different features of the present invention can be combined to create embodiments other than those described in the following.

DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

Figure 1:
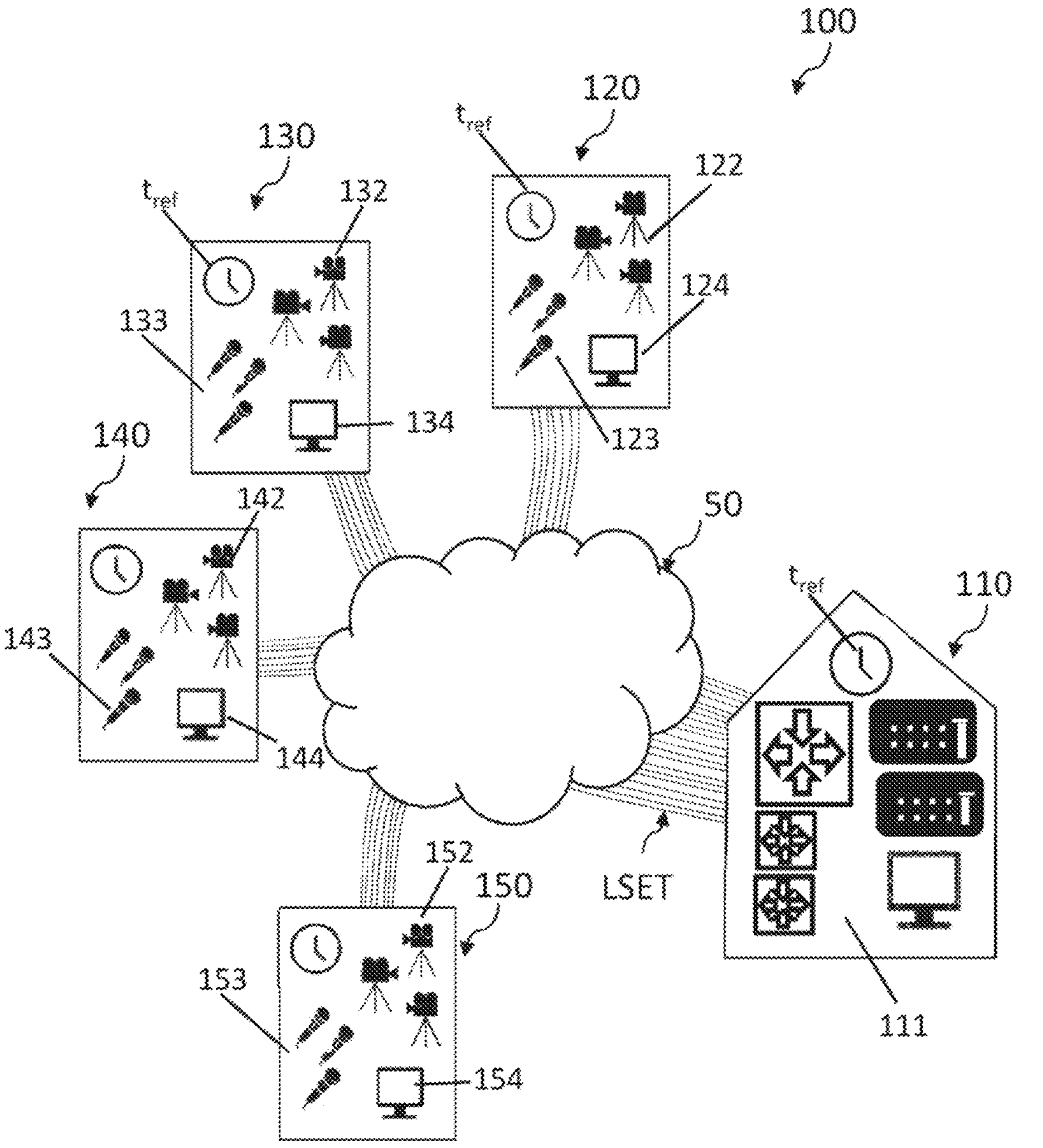
FIG. 1 is a schematic block diagram illustrating a remote to central media production system according to embodiments of the present inventive concept.

FIG. 1 is a block diagram schematically illustrating a remote media production system 100 of IP type for live or prerecorded remote to central production of e.g. a sports event, in view of which aspects of the inventive concept will be described with additional details associated with exemplifying embodiments discussed further below.

The remote media production system 100 shown in FIG. 1 comprises a production studio 110 and remote production nodes 120, 130, 140, and 150 corresponding to different locations and/or sub-events at one or more venue sites, i.e. a stadium, a local studio and a mobile reporting team stationed outside the stadium (not shown). The remote production nodes 120, 130, 140, and 150 each comprises a plurality of source devices, respectively, e.g. cameras 122, 132, 142, and 152, sound recorders 123, 133, 143, and 153, and processing/transceiver equipment 124, 134, 144, 154 for transmitting data streams comprising video, audio and ancillary data (ANC) from each of the remote productions nodes 120, 130, 140, and 150 over the same or different communication links to the production studio 110 (or Broadcast Centre) over a network 50. The network may be a fixed network (e.g. a LAN, a WAN, the Internet), a wireless network (e.g. a cellular data network), or some combination of these network types, to the receiving node, e.g. a broadcast location such as a local TV studio. The network 50 does not need to be a dedicated network but can be shared with other services. Control instructions and other data may further be transmitted from the production studio 110 over the network to the remote production nodes 120, 130, 140, and 150. The remote production nodes 120, 130, 140, 150 at the venue, optionally an RBC (not shown) and the production studio 110 are thus interconnected with the network 50 that carries all video, audio and data signals. The production studio 110 contains a main portion of production equipment 111 needed to put together a TV-production, like e.g. processing equipment for replays, editing, camera control of cameras at the remote production nodes, audio and video production.

The event is typically captured by the multiple of cameras 122, 132, 142, and 152, and sound recorders 123, 133, 143, and 153, placed at different locations and sub-events at the event site, and each camera and/or microphone generates an individual IP signal corresponding to its capture of the event including e.g. audio data, video data, metadata etc., the protocol and contents depending on the associated source, which is transported from the one or more productions nodes over the network in links (paths) to the production studio or other receiving node (gateway or processing nodes) as individual data streams.

In a remote production system as described herein, the source devices, such as the cameras, microphones etc., typically derive a timing reference from a common master source, time reference $t_{ref}$, such that the timing of the internal clocks in all the source devices is accurately synchronized. A protocol based on e.g. the Precision Time Protocol (PTP) or GPS etc. can be used for such a clock synchronization.

Alternatively, generator-locked instruments are used at the production nodes to generate video signals for further transport to the production studio which are then to be syntonized. Syntonized video signals are frequency-locked, but because of delays in the network (caused by e.g. propagation delay due to different path lengths through the network, processing- and queuing delays in routers in the path, and transmission delay at the source node), the synchronized signals will exhibit differing phases at various points in a television system. Modern video equipment, e.g. production switchers that have multiple video inputs may comprise a variable delay on its inputs to compensate for some phase differences and time all the input signals to phase coincidence.

According to the current inventive concept, the problem with different delay of data streams in the network is attended to by means of the disclosed method for remote media production in an IP network. Monitoring of an aggregate of delays for a set of individual links (LSET) may be carried out in at least one receiving node, here represented by the production studio 110 but which may also refer to a gateway. The receiving node comprises suitable logic, circuitry, interfaces and code capable of monitoring the set of individual data streams and the corresponding delays (LSET) such that a network offset can be determined based on the aggregate of individual delays. Each of the individual delays may be caused by any of or combinations of a non-exhausted list comprising link delay, buffer delay through one or more network nodes, encoding, processing/format conversion (e.g. MPEG-coding conversion) etc. From the aggregate of delays at least one network delay correction factor, CORR factor, is determined, from which at least one CORR factor is selected and utilized for time compensating data transmitted over the individual links. The CORR factor may interchangeable be referred to as a network offset correction factor or a common network offset. Time compensating data is preferably performed by manipulating time stamps, restamping time stamps contained in packets or adding time stamps in packets of the data streams. Optionally, in addition to providing such time compensation or time adjustment, data may be buffered to provide a required alignment of signals being forwarded into the production studio 110.

Figure 2:
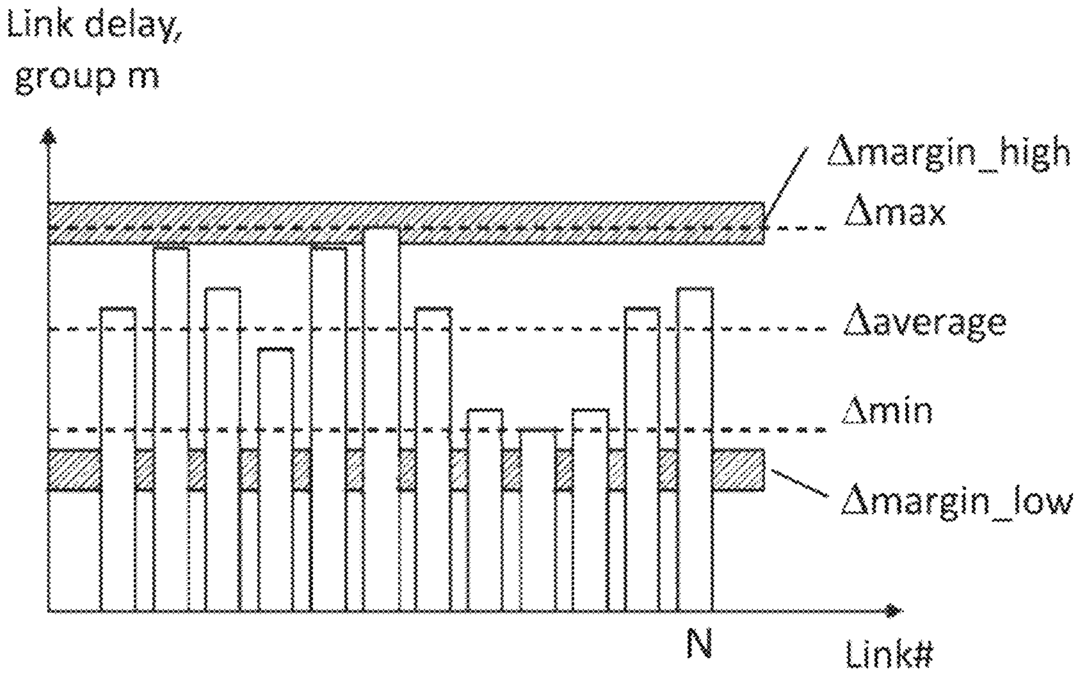
FIG. 2 is a schematic illustration of network delay determined from an aggregate set of individual delays according an embodiment of the present inventive concept.

In FIG. 2, a number N individual delays of different streams and/or potentially group of streams are presented in a bar chart, which delays are derived by monitoring corresponding media streams being transmitting over a network from at least one production node to the receiving node. It should be realized that grouping of individual delays can be formed from groups coming from the same stadium, but it can also be subgroups within the group that passes another production/processing facility or a cloud/data center.

The individual delays may be determined based on time stamps included in the individual data streams using the same clock (e.g., via GPS or network synchronization method) used at the receiving side, and may be monitored continuously or periodically, the latter can be advantageous to reduce resource requirements. Each time stamp in the individual data streams represents the value of the reference time $t_{ref}$ at the moment of transmission/creation of the specific data packet to be transmitted to the receiving node and may be compared to a receive time at the moment of reception of the same packet at the receiving node (on a condition that the receiving node has the same reference time $t_{ref}$).

Depending on where the delay is measured, the delay for specific data streams may include delay caused by data compression, sound processing, and cloud processing. From the monitored aggregate, at least one network offset correction (CORR) factor is determined, e.g. an average delay value (Δaverage), a minimum delay value (Δmin), a maximum delay value (Δmax), an optimum delay value (Δopt), and within a predetermined margin value between a min and max value (or min and max range, respectively), preferably selected on a group basis.

According to an embodiment of the present inventive concept, from the monitored aggregate, at least one CORR factor is determined on a concept based of at least one group, which group concept is described in further detail herein under. The at least one CORR factor is selected from an average delay value, Δaverage of the group, a minimum delay value, Amin of the group, a maximum delay value, Δmax of the group, an optimum delay value, Δopt of the group, and optionally within a predetermined margin value between a min and max value selected on a group basis.

The optimum delay, and/or max- and min margin values may be determined by one of calculating or estimating CORR factor values, or as when utilizing margin values needs to be set based on experience. Machine learning may be applied based on analyzing for example packet delay variations in incoming traffic. According to an embodiment of the method, supervised machine learning is utilized to determine an optimum delay, and/or max- and min margin values, by constructing a predictive data analysis algorithm based on a model of the remote production and/or network system and that makes predictions based on evidence, e.g. previously monitored patterns in the LSET for a specific group in the presence of uncertainty. A supervised learning algorithm takes the known set of input data, i.e. previously monitored patterns in the LSET for a specific group and known responses (output) to that input data. The model is then trained to generate reasonable predictions for the response to new data. The algorithm may be designed for estimation of optimum delay and/or min-max margin values.

Referring again to FIG. 1, consider now that the illustrated media production system 100 covers a big sports event. As previously explained the source devices providing signals from the sports event are here represented by video cameras, sound recorders and the like. A specific set of the source devices, e.g. source devices 132, 133, and 134 at production node 130, are associated with a first group assigned to cover a specific part of the total event, a first sub-event, e.g. to cover a hockey game played in a rink, while other source devices, e.g. source devices 142-144 of production node 140, are associated with a second group dedicated to cover figure skating, i.e. a second sub-event, and yet other source devices, e.g. source devices 122-124 at production node 120, are associated with a third group dedicated to a local event studio. At the same time, video cameras 122 and 132 are associated with a fourth group which represents e.g. a specific camera technology, that is, all or some of source devices associated with a first group and/or all or some of source devices associated with a second group can be associated with e.g. a third group or fourth group. Subgroups of signals/devices covering the same stadium may for instance be processed in a specialized site, like audio processing at a specific geographically separated site and ANC data which is processed automatically in a cloud service where the cloud service location can be located wherever. Then the CORR factor at the home studio needs to be determined considering the different transport delays and processing times of the two sub-groups of the one and same stadium group. That is, the aggregate monitoring of/individual/delays is associated with at least one of several predetermined groups. The predetermined groups are selected from a non-exhaustive list comprising specific production nodes, specific sub-events, type of media stream, such as a video stream, audio stream, metadata/ANC stream, audio-video stream, a specific technology of the production nodes/receiving nodes, and geographic regions. The groups may further be arranged as hierarchical groups, e.g. a group.1 corresponding to a stadium1, group1.1 corresponding to audio from the stadium 1, group1.2 corresponding to UHD from stadium 1, group1.3 corresponding to slow mo from stadium 1, etc.

Removing Minimum WAN Delay Offset

Figure 3:
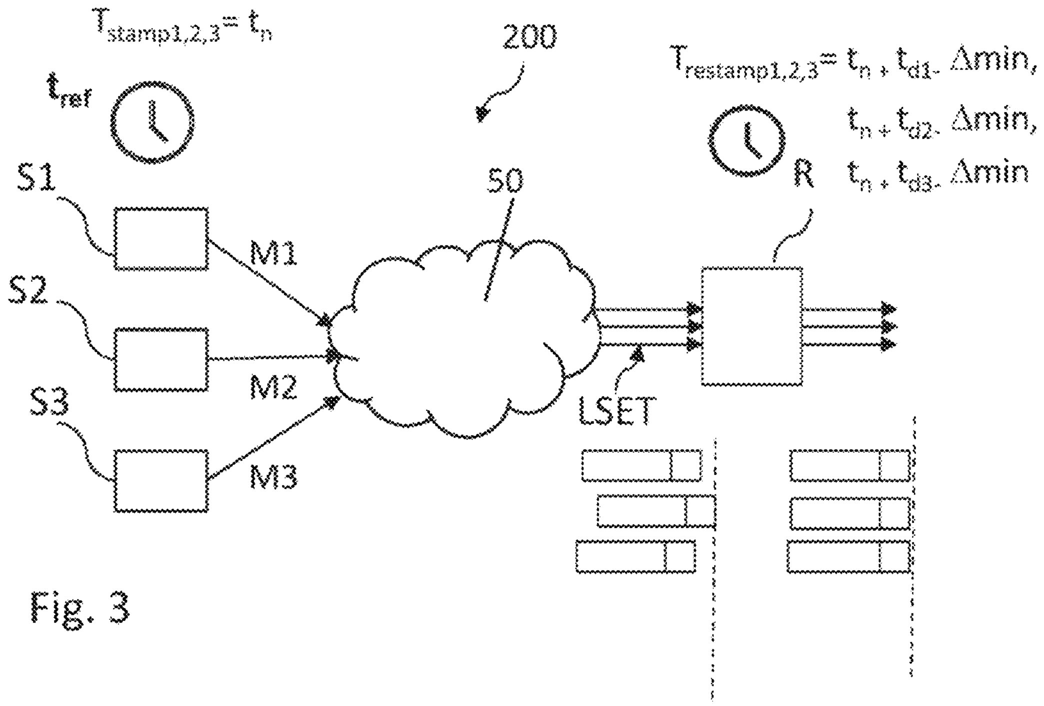
FIG. 3 is a schematic illustration of an exemplifying embodiment of the present inventive concept.

With reference now to FIG. 3, a media distribution system 200 according to an embodiment of the inventive concept is illustrated. Three remote production nodes S1, S2, and S3, are interconnected via a network 50 with a receiving node R, which may be a gateway or a processing center through which the data streams M1, M2, and M3 from the respective production nodes S1, S2, and S3 are received and time stamped with a time compensation based on a determined CORR factor, and subsequently retransmitted before arriving in a production studio (not shown in FIG. 3). Alternatively, there is no gateway, but instead the restamping occurs at the studio.

At each of the production nodes, packets (optionally with the same or correlated specific sequence numbers, respectively) from a source device recording a specific moment in time, are initially time stamped with:

$$T_{stamp1,2,3}=t_{ref\ at\ moment\ n}=t_n.$$

When received at the receiving node R, each of the packets have an individual delay $t_{d1}$, $t_{d2}$, $t_{d3}$ through the network. The correction factor CORR factor is selected as the minimum delay Δmin of the aggregate set of link delays is determined, e.g. $t_{d2}<t_{d1}<t_{d3}$=>$\Delta min=t_{d2}$. To time compensate each of the media streams the respective packets are restamped at the receiver R with a network offset time compensated time:

$$T_{restamp1}=t_n+t_{d1}-\Delta min=t_n+t_{d1}-t_{d2}$$

$$T_{restamp2}=t_n+t_{d2}-\Delta min=t_n+t_{d2}-t_{d2}=t_n$$

$$T_{restamp3}=t_n+t_{d3}-\Delta min=t_n+t_{d3}-t_{d2}$$

Each of the packets that are then forwarded in/retransmitted to the production studio where the time stamp of one of the packets indicates to not experience any delay through the network 50, and where the remaining packets seem to have a smaller link delay through the network. According to the new time stamps, the packets seem to have been "rejuvenated" by removing the minimum delay through the network. This enables the destination equipment to be responsible for absorbing any difference between the min delay and max delay by using in-studio link offset, on a condition that the studio equipment is capable of absorbing the difference between min and max delay. The method optimizes the delay from stadium to studio.

According to another scenario, and according to an embodiment of the inventive concept, as above at each of the production nodes S1-S3, packets (optionally with the same or correlated specific sequence numbers, respectively) from a source device recording a specific moment in time, are time stamped with:

$$T_{stamp1,2,3}=t_{ref\ at\ moment\ n}=t_n.$$

When received at the receiving node R, each of the packets have an individual link delay $t_{d1}$, $t_{d2}$, $t_{d3}$ through the network from which a network correction factor selected as e.g. the maximum delay Δmax is determined. To time compensate the media stream each packet is restamped at the receiver R with a network offset time compensated time:

$$T_{restamp1}=t_n+\Delta max$$

$$T_{restamp2}=t_n+\Delta max$$

$$T_{restamp3}=t_n+\Delta max$$

Each of the packets are then directly forwarded in/retransmitted to the production studio and now appear to have experienced the same delay Δmax through the network 50.

According to an embodiment of the inventive concept, instead of restamping (or in combination with some restamping) the packets, the receiving node R is arranged with buffer capability, and the time compensation of data at R, i.e. the gateway or receiving node, is performed by buffering data received in the data streams and forwarding the buffered data to a receiver or forwards to the processing studio at a time compensated based on the CORR factor, by e.g. adding the network correction factor, e.g. T+Δmax. The network correction factor is preferably selected to an optimum, maximum of within a predetermined margin value.

Figure 4:
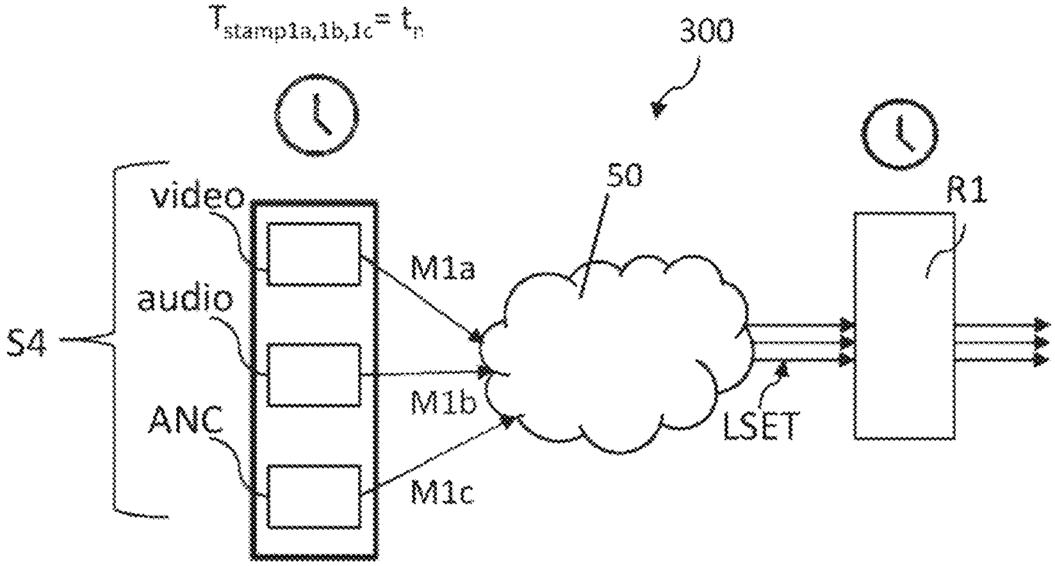
FIG. 4 is a schematic illustration of an exemplifying embodiment of the present inventive concept.

Consider now, with reference to FIG. 4 in which a media distribution system 300 according to an embodiment of the inventive concept is illustrated, another scenario and an embodiment of the inventive concept. A remote production node S4 is interconnected via a network 50 with a receiving node R1, which may be a gateway or a processing center through which the data streams M1a, M1b, and M1c from at least one source device is received. The data streams M1 a, M1 b, and M1 c here represent video, audio and ANC-data streams which are time stamped at the source and transmitted to the receiving node R1 for restamping before being further forwarded in/transmitted to a production studio (not shown in FIG. 4). A group of streams such as for example audio can be sent to an intermediate site (not shown in the figure) for processing before being sent to the destination site R1 doing so called distributed production. The intermediate site can also be a data center (private or public cloud) where production processing can be done. As in the previous example, at the production node packets representing video, audio and ANC are represented by an individual time stamp $$T_{stamp1a,1b,1c}=t_{ref\ at\ moment\ n}=t_n$$

When received at the receiving node R1, each of the packets have an individual delay $t_{d1a}$, $t_{d1b}$, $t_{d1c}$ through the network from which a network correction factor selected as e.g. the maximum delay Δmax is determined. To time compensate the media stream, each packet is restamped at the receiver R with a network offset time compensated time:

$T_{restamp1a}=t_n+\Delta max$ $T_{restamp1b}=t_n+\Delta max$ $T_{restamp1c}=t_n+\Delta max$ Each of the packets are then directly retransmitted to the production studio and now appear to have experienced the same delay Δmax through the network 50.

Distributed Production

Figure 5:
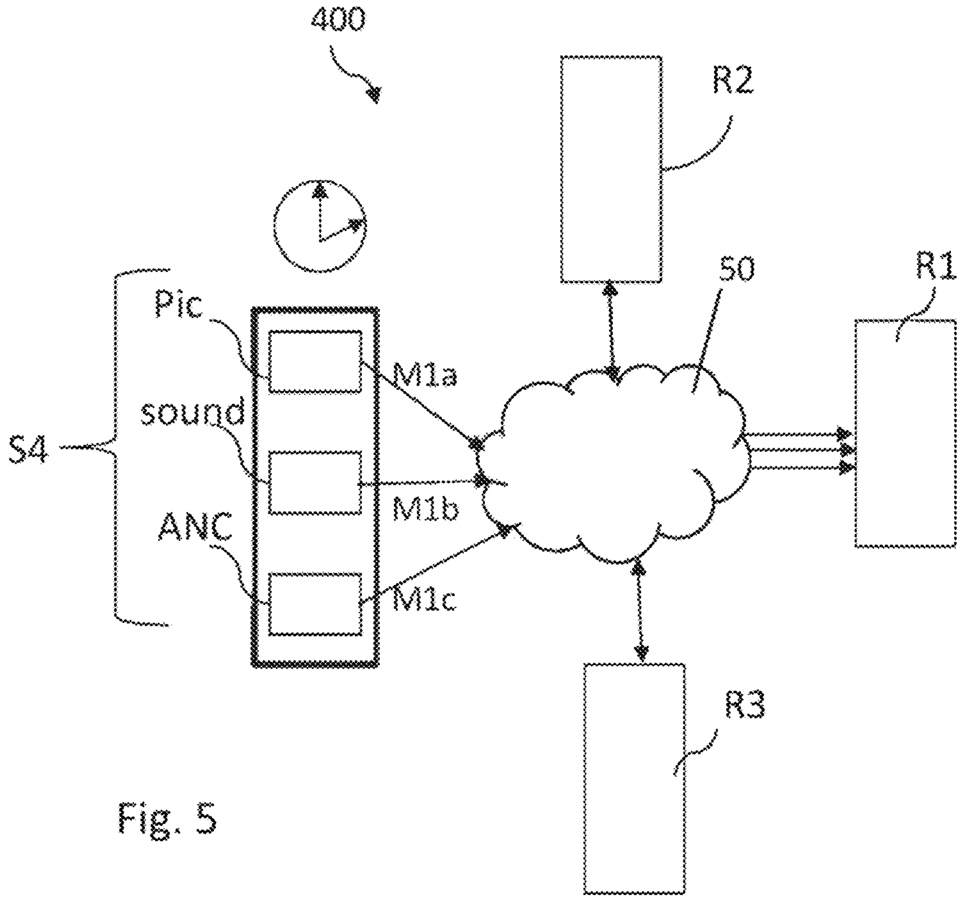
FIG. 5 is a schematic illustration of an exemplifying embodiment of the present inventive concept.

According to an embodiment of the inventive concept as illustrated best with reference to FIG. 5, the inventive concept is directed to distributed remote production. In FIG. 5 an exemplifying embodiment is illustrated in which a media distribution system 400 comprises a remote production node S4, which is interconnected via a network 50 with a receiving node R1, which here is the production studio, receiving node R2, which is a cloud processing center, and receiving node R3, which is an audio processing center, through which data streams M1a, M1b, and M1c from at least one source device is received and optionally time compensated, respectively. The data streams M1a, M1b, and M1c (which may be groups of data streams) here represent video, audio and ANC-data streams, respectively, which are time stamped at the source device in production node S1 and transmitted to one of the receiving nodes R1, R2, or R3 for time compensation and/or processing and optionally further transmission to the production studio R1. As in the previous example above, at the production node S4 packets representing video, audio and ANC are represented by an individual time stamp $T_{stamp1a,1b,1c}=t_{ref\ at\ moment\ n}=t_n$. Distributed production can also be done without the remote production concept. In such case, several sites are used to do different parts of a production. It can be that the studio is located in one site, video production is done in another, audio production in a third and subtitling and meta data is processed as a cloud service.

The video stream M1a is initially optionally compressed at the production node S4 before being transmitted via the network 50 directly to the production studio R1. The total delay for the video stream M1a then adds up to the propagation delay from the production site S4 to the production studio R1 plus time the compression/decompression and optionally further processing time in the production studio R1, while for the audio stream M1b, the total delay comprises its propagation delay from the production site S4 to the audio processing center R3 and to the production studio R1 plus time for audio processing, and for the ANC data stream M1c, the total delay comprises its propagation delay from the production site S4 to the cloud processing center R3 and to the production studio R1 plus time for cloud processing. The CORR factor may be calculated at the production studio R1, in which also time compensation based on a CORR factor determined from the aggregate delays is performed. To coordinate the time stamps between the three sub-groups video, audio and ANC, the longest delay for a sub-group is typically of interest, e.g. the delay for audio. The CORR factor for the incoming may then thus be selected as Δmax, by which all sub-groups are time compensated to coordinate the video-, audio- and ANC data streams associated with the same group, i.e. which belong to production.

Figure 7:
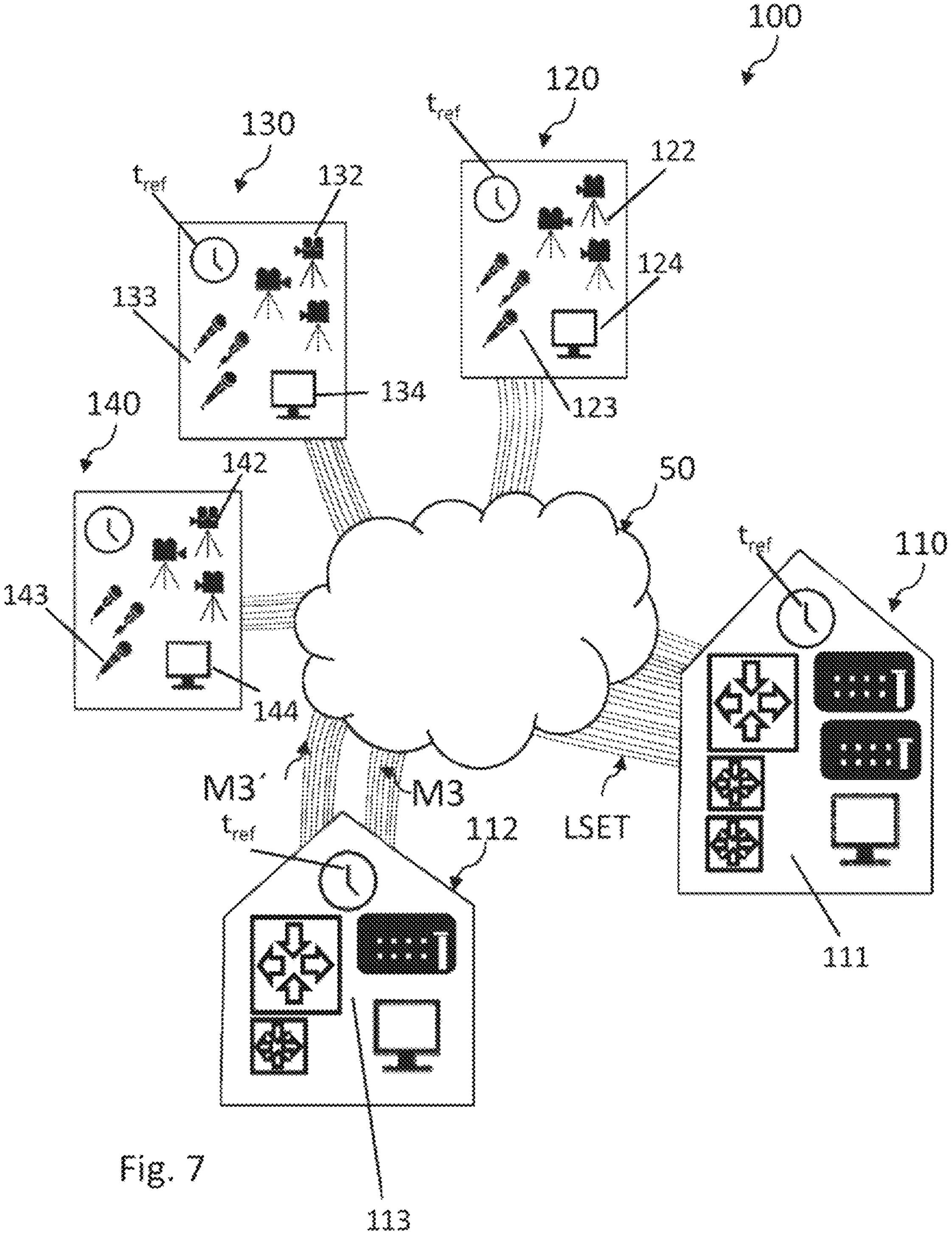
FIG. 7 is a schematic block diagram illustrating a distributed media production system, where different parts of the production are performed at different sites.

FIG. 7 illustrates the remote media production system 100 as shown in FIG. 1 further comprising a distributed production facility 112 which is operating in the remote. The distributed production studio 112 contains a portion of production equipment 113 needed for processing selected data streams of the audio and video production. The distributed production facility 112 receives a subset M3' of the data streams from the production nodes and processes them locally before sending them either to the main production facility 110 or directly to a distribution hub. If the data stream is to be processed again or merged with other data streams processed in production facility 110, the stream M3 is treated as other incoming streams in receiving node 110.

Source Time Manipulation

Figure 6:
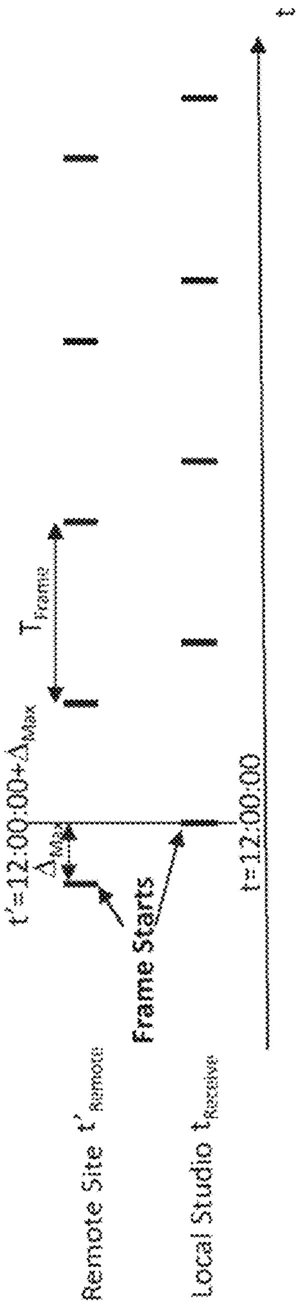
FIG. 6 is a schematic illustration of the adjusted reference source clock used to generate and send streams from a remote production site to optimize delay at the receiving node to avoid frame buffering.

According to an embodiment of the method, the step of time compensating data comprises at a receiving node determining the network correction factor, CORR-factor, and then sending the CORR factor as feedback to a corresponding production node. The production node is arranged to receive the feedback CORR factor from the receiving node and to time compensate outgoing data streams by time stamping data at at least one source device with a local time stamp compensated by adding the CORR factor selected to be e.g. Δmax [(T+Δmax)]; and immediately transmitting the data. The transmission of the data stream(s) is thus performed without buffering the data streams. FIG. 6 is a schematic illustration of use of an adjusted reference source clock used to generate and send streams from a remote production site to optimize delay at the receiving node to avoid frame buffering. At the local studio an aggregate of individual delays of data streams from a production site is monitored and a network delay correction factor is determined, e.g. the maximum delay Δmax at that particular moment. The network delay correction factor is communicated to the remote site, i.e. the production site. The reference source clock $t_{ref}$ used to generate and send streams from the remote production site is then adjusted by the network delay correction factor Δmax such that the data streams are stamped with a time $t'_{Remote}=t+\Delta max$ to optimize the perceived delay of the subsequently received stream at the local studio. At a receive time $t_{Receive}$ the received frame start of received data stamped with t'=12:00:00+Δmax at the local studio thus time wise align with a frame start of local data created at t=12:00:00, the time stamps of the received stream are, which makes it possible to avoid frame buffering. By continuously (or with a predetermined interval) monitoring the aggregate of individual delays of received data streams and determining a selected CORR factor, e.g. Δmax, the communicated CORR factor to the production site can be adjusted to mirror the current status of the network.

Handling Errors

According to an embodiment of the inventive concept, in addition to time compensating data streams in the receiving node, e.g. a gateway, the method further comprises monitoring time stamps of incoming data streams in the LSET of a group being time compensated with a selected network CORR factor, and comparing subsequent time stamps in the incoming data streams of the group to identify sudden changes in time stamps of the incoming data streams of the group. By determining if the currently selected CORR factor is less than a local offset time, typically about 5 ms, errors in the network may be discovered and if that there is an error in the network a new network CORR factor to compensate for the error is selected. For video streams, to handle the error, skip or repeat of frames may be necessary to compensate for the error.

The invention claimed is:

1. A method for compensating for variable network propagation delays in a remote media production system in a wide area network (WAN), the method comprising:

transmitting a multiple of individual data streams over the WAN from at least one production node to at least one receiving node;

monitoring individual network propagation delays (LSET) for the multiple of individual data streams;

determining at least one common network offset for compensating said multiple of individual data streams based on an aggregate of the monitored individual network propagation delays, said aggregate representing a current network status;

time adjusting data in said multiple of individual data streams transmitted over said WAN by manipulating time stamps of said individual data streams using said at least one common network offset; and immediately transmitting said data such that said data is transmitted without buffering said data.

2. The method according to claim 1, wherein said multiple of individual data streams are associated with at least one of a number of predetermined groups.

3. The method according to claim 1, wherein said determining the at least one common network offset is based on time stamps.

4. The method according to claim 1, wherein said determining the at least one common network offset comprises determining in said LSET at least one of an average delay value, a minimum delay value, a maximum delay value, an optimum delay value, and a network delay correction factor within at least one predetermined max and/or min margin value.

5. The method according to claim 4, wherein said optimum delay value, and/or said at least one predetermined max and/or min margin value are determined by at least one of:

calculation, estimation, based on network properties, by a third part, via a management interface, and by machine learning.

6. The method according to claim 1, wherein said manipulating time stamps is performed in the at least one receiving node or in the at least one production node.

7. The method according to claim 1, wherein said manipulating time stamps comprises timestamping data in said individual data streams with a local time stamp compensated by removing or adding said at least one common network offset, or exchanging an experienced network delay with said at least one common network offset.

8. The method according to claim 1, wherein said manipulating time stamps comprises, at said at least one production node, time stamping data of at least one source device with a local time stamp compensated by said at least one common network offset.

9. The method according to claim 1, wherein said manipulating time stamps comprises, at said at least one production node, adjusting time of a source clock with said at least one common network offset.

10. The method according to claim 9, wherein the adjusted time of the source clock is distributed back over the WAN using a network time protocol.

11. The method according to claim 9, wherein a node in said at least one production node is adjusting said source clock using a reference source clock and the at least one common network offset received from said at least one receiving node.

12. The method according to claim 9, further comprising adjusting time of said source clock to provide frame start alignment with respect to frame start of locally/studio generated data streams.

13. The method according to claim 1, further comprising:

monitoring and comparing subsequent time stamps in said individual data streams to provide a local offset time; and upon detecting sudden changes between the subsequent time stamps by determining that a currently selected common network offset is less than said local offset time:

selecting a new common network offset from said at least one common network offset, or determining at least one new common network offset.

14. The method according to claim 1, further comprising adjusting said time stamps to provide frame start alignment with respect to frame start of locally/studio generated data streams.

15. The method according to claim 1, wherein said manipulating time stamps comprises:

adding an additional time stamp with a local time stamp compensated by removing or adding said at least one common network offset or by exchanging an experienced network delay with said at least one common network offset.

16. The method according to claim 1, wherein the multiple of individual data streams are live content data streams.

17. The method according to claim 1, wherein said at least one common network offset is used to provide mutual frame alignment for live production switching.

18. A node in a distribution network, the node comprising a computer processor programmed to perform the method according to claim 1.

19. A memory device storing a program executable by a computer processor to cause the computer processor to perform the method according to claim 1.

20. A Gateway in a WAN production network comprising means for performing the method according to claim 1.

21. A node in a distribution network, the node comprising a computer processor programmed to perform the method according to claim 13.

22. A memory device storing a program executable by a computer processor to cause the computer processor to perform the method according to claim 13.

23. A Gateway in a WAN production network comprising means for performing the method according to claim 13.

* * * * *